Feb. 25, 1930.  J. B. FISHER  1,748,120
BEARING STRUCTURE
Filed Feb. 26, 1926   2 Sheets-Sheet 1

Inventor,
James B. Fisher
By Brown, Boettcher, Glenner
Attys.

Feb. 25, 1930.  J. B. FISHER  1,748,120
BEARING STRUCTURE
Filed Feb. 26, 1926  2 Sheets-Sheet 2

Inventor,
James B. Fisher
By Brown, Boettcher, Dienner
Attys.

Patented Feb. 25, 1930

1,748,120

UNITED STATES PATENT OFFICE

JAMES B. FISHER, OF WAUKESHA, WISCONSIN, ASSIGNOR TO WAUKESHA MOTOR COMPANY, OF WAUKESHA, WISCONSIN, A CORPORATION OF WISCONSIN

BEARING STRUCTURE

Application filed February 26, 1926. Serial No. 90,747.

My invention relates to bearing structures, particularly to the lubrication thereof where the lubricating oil is fed under pressure, the invention being of particular utility in connection with internal combustion engines where the crank shaft bearings comprise stationary and removable bearing halves between which aligning shims are usually placed.

The bearing halves are usually lined with bearing material such as Babbitt metal or Fahrig metal and in or through which the oil conducting groove is cut. Heretofore such groove extended entirely around the bearing circumference and was connected with the oil supply pipe or duct. With this arrangement the oil groove section of each bearing half had to align at its ends with the ends of the groove in the other half, and to ensure a non-leakage joint the usual practice has been to project the shims a distance inwardly beyond the bearing half joints and to then bore or ream the bearing passageway and the oil groove so as to insure a perfect fit. Even with such careful work the least displacement of a shim during assembly of the halves when receiving a shaft might result in leakage between the oil groove sections and consequently the loss of pressure, and the efficiency of the lubrication would be destroyed.

The important object of my invention is to provide an arrangement of oil grooves and the feeding thereof which will eliminate the necessity of careful machining or other finishing and which will insure the maintenance of the full pressure on the oil. This I accomplish by providing in each bearing half a well or groove which does not extend to the ends of the half, but which is closed by the shaft and connected only with an oil distributing channel extending around the outside of the bearing halves and receiving oil from an oil pump.

The invention will be fully understood by reference to the drawings, in which

Within the crank case C is shown the crank shaft S and its center and rear bearing structures B and B'. The oil pump P is driven by the gearing chain A from the cam shaft D, the pump drawing oil from the well E and a distributing pipe F leading from the pump distributes the oil to the crank shaft bearings.

Figure 1:
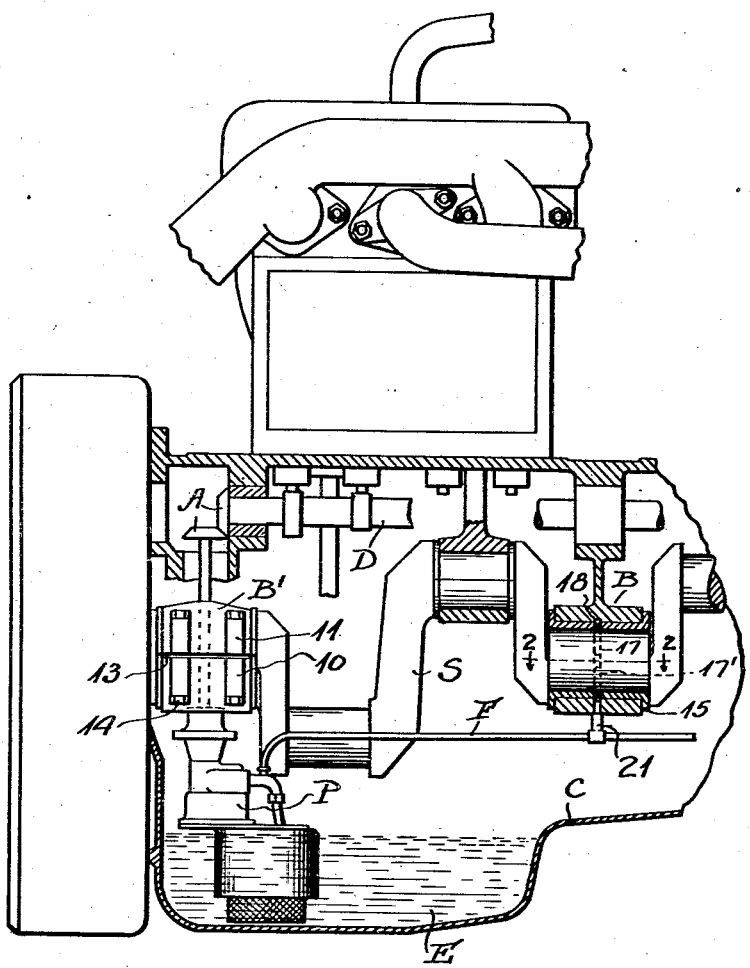
Fig. 1 is a side elevational view partly in section of an engine showing part of the crank shaft, its supporting bearing, and pumping means for supplying oil under pressure to the bearing.
Figure 2:
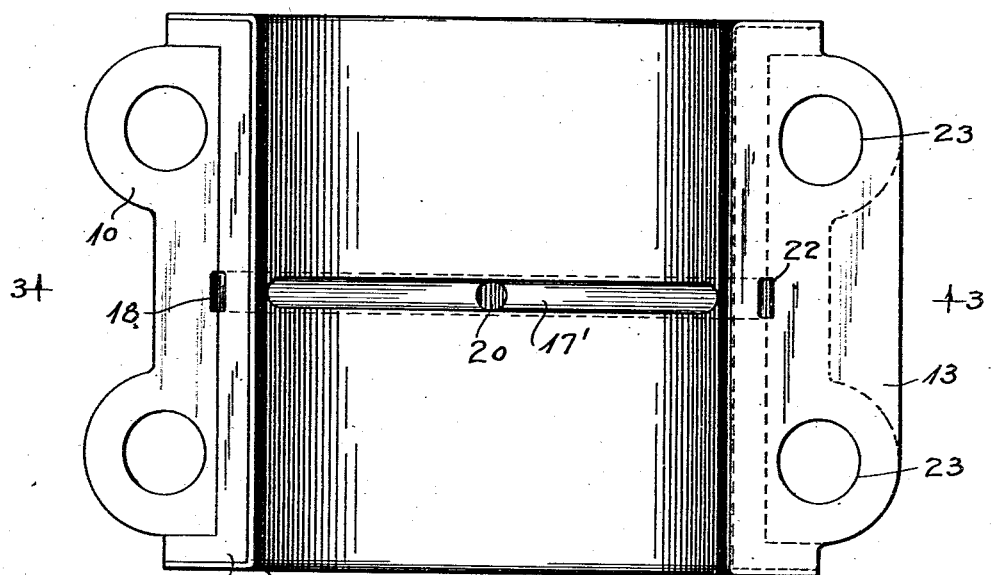
Fig. 2 is an enlarged sectional view on plane 2—2 of Fig. 1.
Figure 3:
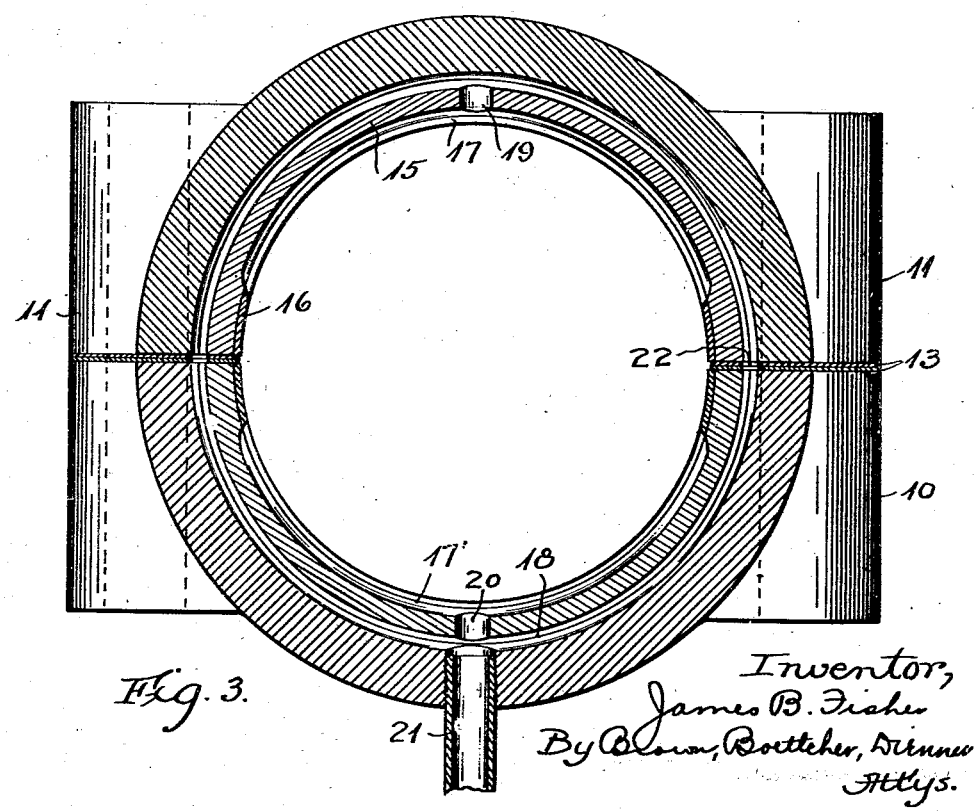
Fig. 3 is a sectional view on plane 3—3 of Fig. 2.

Referring to Figs. 2 and 3, the lower or removable bearing half or cap has the lugs 10 for registering with the lugs 11 on the stationary or upper bearing half, the aligning and fitting shims 13 being inserted between the halves before the bolts 14 are tightened up to secure the bearing halves around the respective shaft section. To reduce the friction of the bearings a bushing 15 is usually provided lined or faced with a thin layer of bearing material 16, such as Babbitt metal or Fahrig metal, the bushing being in halves to fit the bearing frame halves as is the usual practice.

In accordance with my invention I provide in the stationary bearing half bushing an oil groove 17 and in the bushing of the lower or removable bearing half I provide a similar oil groove 17', these grooves extending transversely in the bushings but terminating short of the edges thereof so that the grooves will form wells extending transversely along the shaft and closed thereby.

To supply oil to these lubricating wells, I provide a distributing channel 18, which channel may be cut entirely in the bushing or the bearing frame, or partly in both, as shown. Preferably the channel is formed by cutting continuous or registering grooves in the bushing and frame, and the channel is preferably located in the same diametral plane with the distributing wells 17 and 17', with which the channel is connected respectively through passageways 19 and 20 through the bushing halves. The channel 18 is connected by the branch pipe 21 with the oil distributing pipe F leading from the pump P and the oil is distributed by the channel and through the passageways 19 and 20 to the respective wells 17 and 17' from which the oil is drawn by the shaft which is lubricated thereby, the pressure forcing the oil out of the wells to the shaft between which and the bushings it travels laterally to the bearing ends from which it escapes and is returned to the oil well E.

Where shims are inserted between the bearing halves, the channel 18 must, of course, extend therethrough and, as best shown in Fig. 2, I provide each of the shims 13 with a hole 22, which holes will form passageways through the shims that register with the sections of the channel 18. When the bearing bolts 14 are drawn up, the shims will be compressed between the bearing halves and any leakage at the holes 22 or at their juncture with the channel sections, will be prevented and the full pressure of the lubricating oil will thus at all times be maintained in the channel and in the distributing wells 17 and 17'. With my improved arrangement the shims can be formed so that when applied between the bearing halves their inner edges will extend short of the bearing face or surface of the bearing passageways so that any slight displacement of the shims will have no effect and will not require special finishing operation. The shims have also the holes 23 for receiving the bearing bolts 14.

It is evident that instead of only a single distributing oil well for each bearing half a number of wells could be provided and interconnected or connected directly with the supply channel 18. When the engine is operating at high speed or under heavy load and high temperature, the strain might cause deflection or relative displacement of the bearing halves, and with the old arrangement where the distributing grooves on one half communicated with those on the other half, such displacement would tend to open up the connections between the grooves and permit leakage and disturbance of the oil pressure. However, with my arrangement, where the distributing wells are dead ended, any distortion or displacement of the bearing halves would have no effect on the pressure. There could be no leakage from the channel 18 even though the bearing halves or shims became slightly displaced as the pressure caused by the bolts 14 would keep the joints sufficiently tight to prevent any such leakage. The proper pressure for the most efficient lubricating oil distribution will, therefore, be maintained.

Having described my invention, I claim as follows:—

In combination, a bearing structure including separable sections, bushing sections in the respective bearing sections and each provided in its bearing face with a groove terminating short of the edges thereof, each bushing section also having in its outer face a circumferential channel extending from edge to edge thereof and provided with holes opening into said grooves, a shaft rotatably mounted through the bushing sections and closing the inner sides of the grooves, shims between the bearing sections and forming therewith fluid tight closures, the shims and the bushing sections fitting snugly about the shaft and the shims having openings in register with each other and with said channels and forming therewith a sealed oil passage, a source of oil supply, and means for supplying oil under pressure from said source to the oil passage.

In witness whereof, I hereunto subscribe my name this 19th day of February, 1926.

JAMES B. FISHER.